United States Patent
Kleinpeter et al.

(10) Patent No.: US 8,634,947 B1
(45) Date of Patent: Jan. 21, 2014

(54) SYSTEM AND METHOD FOR IDENTIFYING DIGITAL FILES

(75) Inventors: Thomas W. Kleinpeter, Kirkland, WA (US); Michael 'Saad Merhej, Bellevue, WA (US); Viraj Mody, Bellevue, WA (US)

(73) Assignees: Michael Merhej, Bellevue, WA (US); Thomas Kleinpeter, Kirkland, WA (US)

( * ) Notice: Subject to any disclaimer, the term of this patent is extended or adjusted under 35 U.S.C. 154(b) by 513 days.

(21) Appl. No.: 12/908,045

(22) Filed: Oct. 20, 2010

Related U.S. Application Data

(60) Provisional application No. 61/253,557, filed on Oct. 21, 2009.

(51) Int. Cl.
*G06F 17/00* (2006.01)

(52) U.S. Cl.
USPC .......................................................... 700/94

(58) Field of Classification Search
USPC .................... 700/94; 369/1–12; 704/500–504
See application file for complete search history.

(56) References Cited

U.S. PATENT DOCUMENTS

| | | | |
|---|---|---|---|
| 2002/0049760 A1* | 4/2002 | Scott et al. | 707/10 |
| 2004/0034650 A1* | 2/2004 | Springer et al. | 707/102 |
| 2005/0004941 A1* | 1/2005 | Kalker et al. | 707/104.1 |
| 2009/0164564 A1* | 6/2009 | Willis | 709/203 |
| 2009/0259690 A1* | 10/2009 | Bogdanov | 707/104.1 |

* cited by examiner

*Primary Examiner* — Andrew C Flanders
(74) *Attorney, Agent, or Firm* — Sprinkle IP Law Group

(57) ABSTRACT

Methods and systems that utilize fingerprints or metadata to identify digital audio files are disclosed. In particular, in certain embodiments a fingerprint of a digital audio file may be utilized to find a set of fingerprints that are related to the fingerprint of the digital audio file it is desired to identify. Using the metadata associated with each of the set of related fingerprints a song, artist or album can be identified and assigned to the digital audio file it was desired to identify. Additionally, the identified song, artist or album name may be associated with the digital audio files corresponding to each of the identified related acoustic fingerprints. In this manner, not only can digital audio files be identified but additionally, data associated with previously identified digital audio files may be iteratively refined by associating updated metadata with previously labeled digital audio files.

21 Claims, 2 Drawing Sheets

SYSTEM AND METHOD FOR IDENTIFYING DIGITAL FILES

RELATED APPLICATIONS

This application claims a benefit of priority to U.S. Provisional Patent Application No. 61/253,557 filed Oct. 21, 2009, entitled "System and Method for Identifying Songs Using Acoustical Fingerprints" by Thomas Kleinpeter, Michael Merhej and Viraj Mody the entire contents of which are fully incorporated by reference herein.

TECHNICAL FIELD

The present disclosure relates generally to digital files, including digital audio or video files. More particularly, the present disclosure relates to the identification of digital files, including the identification of digital audio or video files. Even more specifically, the present disclosure relates to the use of digital fingerprints or metadata to identify digital audio or video files.

BACKGROUND

In the past decade the use of digital audio and video has emerged because of its usefulness in the recording, manipulation, mass-production, and distribution of audio or video data. The distribution of music across the internet through on-line stores or file-sharing sites may depend on digital recording and digital compression algorithms but in the main distribution of audio or video as data files (digital files) rather than as physical objects has significantly reduced costs of distribution.

Commensurate with the development of digital audio (which will be understood herein to refer to any type of digital media file, including digital audio or digital video files) has been a reduction in the cost of storage. The decline in the cost of storage coupled with the increase in the prevalence of digital audio technology has led to users having large digital music or movie collections on their home computers. These large individual digital collections have led to the development of systems and methods to assist users in the management of these collections.

In particular, certain of these organizational systems may attempt to identify and catalogue, or otherwise organize, digital audio files which are resident on a user's computer such that a user can access such a system to browse, organize, access or otherwise manage their digital music collection utilizing an interface provided by such a system. Thus, to improve a user experience, it is desired that such systems can substantially automatically identify both the song and artist or an associated album for digital audio files stored at the user's computers such that these songs, artists or albums may be utilized to manage the user's collection.

As the tastes of users may be quite diverse and users' collections may include digital audio files which they created or are not widely distributed, this task may not be straightforward. While most digital audio files contain metadata that identify the song and artist, many files are missing these tags, or have errors of several varieties: misspellings, mis-identifications, or just useless information (e.g., "Track 06" as a song name). Hence, it is desired to substantially automatically identify digital audio files without relying solely on such metadata.

One method for identifying digital audio files is to utilize a reference database of known digital audio files such that a digital audio file of a user may be associated with one of the known digital audio files and the artist, song or album information associated with the known audio file may be associated with that digital audio file of the user. This type of reference database may be difficult to come by and, for a variety of reasons including the addition of new files, it can almost be assured that such a reference database will not include certain digital audio files. Additionally, in many cases users may be charged for the use of such databases.

What is desired then, are systems and method for the identification of digital files using an evolving database, where the database can be iteratively refined in conjunction with the addition of new users or the processing of new digital files.

SUMMARY

Methods and systems that utilize fingerprints or metadata to identify digital audio files are disclosed. In particular, in certain embodiments a fingerprint of a digital audio file may be utilized to find a set of fingerprints that are related to the fingerprint of the digital audio file it is desired to identify. Using the metadata associated with each of the set of related fingerprints a song, artist or album can be identified and assigned to the digital audio file it was desired to identify. Additionally, the identified song, artist or album name may be associated with the digital audio files corresponding to each of the identified related acoustic fingerprints. In this manner, not only can digital audio files be identified but additionally, data associated with previously identified digital audio files may be iteratively refined by associating updated metadata with previously labeled digital audio files.

In one embodiment a digital audio file may be associated with a song name utilizing a fingerprint associated with the digital audio file. Metadata including song names associated with one or more digital audio files may be obtained based on the fingerprint and the song names processed to determine a song name to associate with digital audio file. Furthermore, in certain embodiments the song name may also be associated with other digital audio files determined from the fingerprint.

In some embodiments, processing the metadata may comprise grouping the one or more song names into a set of groups, each group comprising the song names that are considered equivalent and determining the most common song name within the group with the highest number of entries.

Embodiments of the systems and methods disclosed may provide a myriad number of advantages. For example, these systems and method may allow a user to better manage his music collection and provide a better user experience. Additionally, as digital music files may be consistently identified across users, music recommendations and comparisons may be more easily achieved. Furthermore, the consistent identification of music may enable the distribution of data related to the digital audio files from a central system or between and among users. Such data may include, for example, liner notes or image data including album artwork, concert photos or videos, etc. The data may also include a version of the digital audio file itself.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
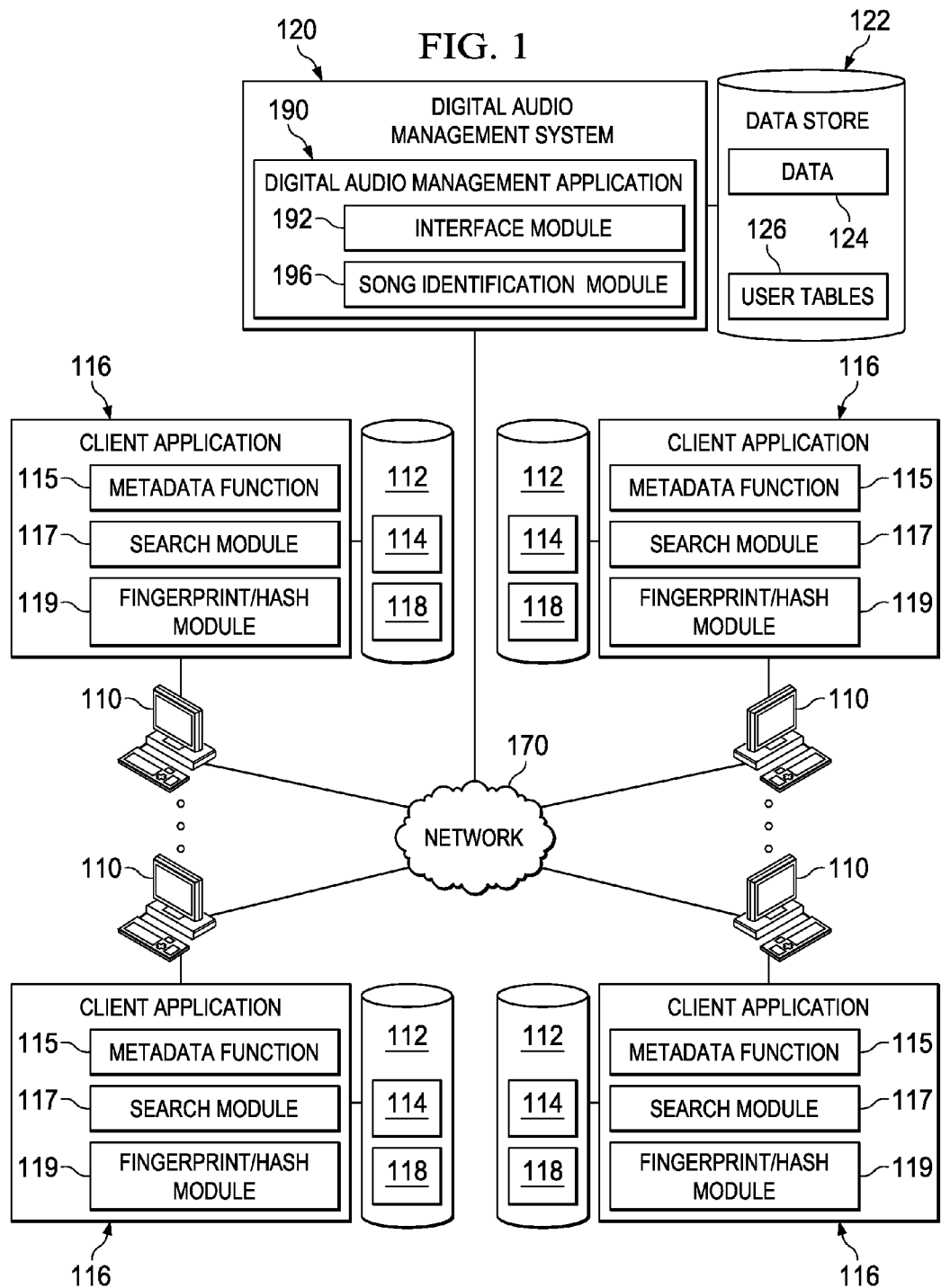
FIG. 1 depicts one embodiment of a topology including a digital audio management system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

Before discussing specific embodiments, embodiments of a hardware architecture for implementing certain embodiments are described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer instructions executable (in other which can be directly executed or made executable by, for example, compilation, translation, etc.) by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.", "in one embodiment."

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. For example, though embodiments of the present invention have been presented in conjunction with digital audio files it will be noted that other embodiments of the present invention may also be effectively utilized in conjunction with digital video files or the audio portion of digital video files, or other types of digital files, etc.

As mentioned above, in recent years the management of digital files has become increasingly important. These management systems may attempt to identify and catalogue, or otherwise organize, digital audio files which are resident on a user's computer such that a user can access such a system to browse, organize, access or otherwise manage their digital music collection utilizing an interface provided by such a system. Thus, to improve a user experience, it is desired that such systems can substantially automatically identify the song, artist, and album for digital audio files stored at the user's computers such that these songs, artists, and albums may be utilized to manage the user's collection. What is needed then, are systems and method for the identification of digital audio files using an evolving database of fingerprints and metadata, where the database can be iteratively refined in conjunction with the addition of new users or the processing of new digital audio files.

To that end, among others, attention is now directed to the systems and methods of embodiments of the present invention. Specifically, embodiments of the present invention may utilize fingerprints or metadata to identify digital audio files. In particular, a fingerprint of a digital audio file may be utilized to find a set of fingerprints that are related to the fingerprint of the digital audio file it is desired to identify. Using the metadata associated with each of the set of related fingerprints a song, artist or album can be identified and assigned to the digital audio file it was desired to identify. Additionally, the identified song, artist or album name may be associated with the digital audio files corresponding to each of the identified related acoustic fingerprints. In this manner, not only can digital audio files be identified but additionally, data associated with previously identified digital audio files may be iteratively refined by associating updated metadata with previously labeled digital audio files.

Embodiments of the systems and methods of the present invention may be better explained with reference to FIG. 1 which depicts one embodiment of a topology which may be used to implement embodiments of the systems and methods of the present invention. Topology 100 comprises a set of entities including digital audio management system 120 (also referred to herein as the AG Entertainment system) which is coupled through network 170 to computing devices 110 (e.g. computer systems, personal data assistants, kiosks, etc.). The AG Entertainment system 120 may be executing a digital audio management application 190 (referred to as the AG Entertainment application and including one or more computer readable instructions) which may allow users at computing devices 110 to more easily manage their digital music collections utilizing data stored in data store 122.

More specifically, users at computing devices 110 may have a collection of digital audio files 114 (e.g. mp3, mp4, FLAC, AAC, wav, TAK, TTA, AU, ogg, mpc, ra, divx, mpeg, avi, etc.) which are stored in a data store 112 (which may be any type of local or remote storage on which a user stores data). Each of these digital audio files may have associated metadata such as song title, artist, album, year, track, etc., stored in a metadata container such as that defined by the ID3 format or stored in MP4 Atoms, or other associated metadata which may stored or determined, such as a directory name, file name, file size, play time, etc. As the number of digital audio files 114 which a user may have can be in the thousands (or more) many users may desire to utilize efficient and intuitive means for managing these digital music collections.

To facilitate the management of these digital audio files 114 the AG Entertainment application 190 may provide just such a capability. More specifically, the AG Entertainment application 190 may obtain data (including metadata) associated with a user's digital music collection 114 using a client application 116 residing on the user's computing device 110. The client application 116 residing on the user's computing device 110 may have a search module 117 that is configured to search the data store 112 associated with the user's computing device 110 for digital audio files; a metadata module 115 that is configured to obtain metadata (for example ID3 tags or other metadata associated with a digital file); and a fingerprint/hash module 119 that is configured to calculate a fingerprint of a digital audio file or one or more hashes associated with a digital audio file as will be described in more detail later. The client application 116 may thus be configured to communicate data to the digital audio management system 120 using interface module 192. Such a communication may be in response to an instruction received by client application 116 from the digital audio management system or may be originated from client application 116 without prompting from the digital audio management system 120.

Data 124 related to the digital audio files 114 of the user may then be stored in data store 122 and utilized by the AG Entertainment application 190 to assist a user in managing his digital audio files 114. While it should be noted that any suitable schema or architecture may be used for the storage of such data, it may be useful here to discuss one particular embodiment of a schema that may be used to store data for use by AG Entertainment application 190 in data store 122.

In one embodiment, then, at least a portion of data store 122 may configured as a set of core tables stored in data store 122. This core set of tables may include one or more artist tables, song tables, album tables, fullprints tables, identifiedprints tables or hashtoprint tables. Each row of an artist table may comprise an artistID and an artist name, each row of a song table may comprise a songID, an artistID and a song name and each row of an album table may comprise an albumID, an artistID and an album name. When adding a row to an artist table, it may be the case that only an artist name is needed, as an artistID (which may be unique relative to other artistIDs) may be automatically generated and assigned. Similarly, when adding a row to a song table only a song name may be needed as a songID may be assigned automatically and when adding a row to an album table only an album name may be needed as an albumID may be assigned automatically. Thus, in one embodiment, in the artist tables each artist name is unique, while in the songs table the artistID and song name of a row may be unique and in the album tables the artistID and album name of a row may be unique.

Each row of a fullprints table may comprise a printID, an actual fingerprint taken from a digital audio file and the length in seconds of the digital audio from which the fingerprint was created. Accordingly, a row may be added to this table when a fingerprint is received that is not currently in the fullprints table. The printID may be an "auto increment" column, so that when a new row is inserted the printID may be automatically assigned as one greater than the printID of the last row of the table, the previously highest numbered printID, etc.

In the identifiedprints table each row may comprise a printID, a songID, a songConf (a confidence level associated with the songID), an albumID, an albumConf (a confidence level associated with the albumID). A row may be added to this table when a songID or an albumID is selected to be assigned to a fingerprint (as will be discussed in more detail later).

A hashtoprint table may have rows comprising the hash of a digital audio file and an associated printID. Using this table, then, if a hash is received a matching row in a hashtoprint table may be located if it exists. From this row the associated printID can be obtained and used to look up information in other tables. For example, a printID may used with identifiedprints table to locate information such as songID, albumID, songConf and albumConf. From the songID a song name may be located, from an albumID an album name may be located, etc.

Additionally there may be one or more metadata tables that comprise data (including the metadata) on digital audio files stored in user's data stores 112. Each row of a metadata table may comprise a printID, the clientID (associated with a user), the hash of the digital audio file, and the metadata associated with that digital audio file. Note then, that each printID may be associated with multiple rows as different users may have the same (or similar) digital audio files associated with different metadata. Note as well that in one embodiment the hash of the combination of the printID and clientID may be unique such that if one user has multiple copies of the same file, there may be only one entry for that digital audio file in the metadata tables. Thus, for each digital audio file (which for example, has been processed using the client application on the user's computer) in a user's data store 112 there may be an entry in a metadata table, where the clientID corresponds to that user and the metadata of that entry comprises the metadata associated with that digital audio file in that user's data store 122.

It should be noted that while any suitable schema or architecture may be used for the storage of such data, in one embodiment it may be desired to shard data store 122 to increase the efficiency of searching or access to data stored therein. For example, in one embodiment, fingerprints may be represented by a sequence of 892 integers, which is equivalent to 3568 bytes. To reduce storage costs, the fingerprints may be compressed before they are stored. While standard compression algorithms may be utilized they may not be ideal for this type of data. Thus, a fingerprint may be transformed before compressing it with gzip to increase gzip's efficiency. Starting with fingerprint having a sequence of numbers: A, B, C, etc., the fingerprint may be transformed by transforming the sequence into A, A XOR B, B XOR C, and then compressing it with gzip. This may improve the efficiency in that the XOR operation (exclusive OR) returns a number with a small number of bits set when performed on two similar numbers. This decreases the number of unique numbers in the sequence, which increases the gzip compression efficiency. The operation is reversible, so after uncompressing the data, the original sequence can be restored. Utilizing such an algorithm, the average length of a stored fingerprint may be around is 976 bytes, about 27% of the raw size.

To further increase efficiency, certain tables may be sharded (for example, into 64 or a different number of separate tables based on one or more criteria). For example, the fullprint tables may be sharded by play time. All the fingerprints in a given table may correspond to digital audio files having the same range of times (for example, one table may comprise fingerprints associated with digital audio files having a play time from 300 seconds to 310 seconds, another table may comprise fingerprints associated with digital audio files having a play time from 311 seconds to 320 seconds, etc.). This configuration may be used advantageously with certain search algorithms or for certain types of searches. For example, such a configuration may be useful when it is desired to search for fingerprints with a similar time to a particular fingerprint (in other words for fingerprints associated with digital audio files having a similar play time to the digital audio file associated with the particular fingerprint). So to find the fingerprint with a corresponding playtime that is within 10 seconds of a particular playtime, only tables containing fingerprints within 10 seconds of the particular playtime would need to be searched.

It may also be useful to the efficiency of the AG Entertainment application 190 to be able to locate the table for a particular fingerprint quickly. This goal may be achieved by allowing the ID for the table which comprises the fingerprint to be determined from the printID of the fingerprint. Accordingly, in one embodiment, printIDs are 8 byte integers generated by combining the table ID of a fingerprint and a sequence number. The print table ID may be stored in the most significant byte of the 8 byte ID. So for example, the first 2 printIDs in the second print table have the following IDs in hexadecimal: 200000000000000 and 200000000000001.

Data store 122 may also comprise one or more user tables 126. In one embodiment, there may be one or more user tables corresponding to each user. These user tables may comprise one or more artist tables, song tables and album tables that comprise data associated only with the corresponding user. Thus, each user may have a set of tables that comprise the information utilized by the user's to identify his collections and the user's files can be managed specifically to each user using the tables corresponding to that user.

Using interface 192 provided by the AG Entertainment system, then, a user may manage his digital music collection 114. The management functionality of the AG Entertainment system 120 may be implemented, at least in part, using data 124 corresponding to the user's digital audio files 114 stored in the data store 122 or data 118 associated with the client application 116 stored in the user's data store 112. In particular management of a user's digital audio files may be accomplished using user tables corresponding to that user such that data specific to the user may be utilized to manage the user's digital audio files.

As discussed above, however, the number of digital audio files 114 may be quite large and many of these files may be associated with incorrect identifiers. Thus, a user may wish to upload data on each of these digital audio files. This process may be time intensive and the prospect of such a task may dissuade a user from using the management functionality offered by the AG Entertainment system 120. It is therefore advantageous to have an automated or semi-automated process for uploading data on a user's digital audio files 114 to alleviate as much of a user's burden as possible. As part of this uploading process and for other reasons pertinent to the management of the user's digital audio files it may also be desirable to substantially automatically identify the digital audio files 114 in the user's data store 112.

Accordingly, the AG Entertainment application 190 may comprise a song identification module 196 operable to identify digital audio files 114 of a user. The song identification module may utilize data 124 stored in data store 122, where this data may comprise data obtained from a user's computing device 110 using the client application 116, data determined by AG Entertainment application 190 from this obtained data or from other data, data obtained from a third party data source, data determined from third party data or any other type of data desired. This data, as stored in the core tables of in the data store 122 can then be used to manage the user's digital music collection.

By allowing the management of user's digital music collection using data obtained from a variety of sources, including other users, the user may be provided with better information regarding his digital music which, in turn, allows the user to better manage his digital music collection. In one embodiment, a user may desire to play or otherwise manipulate his digital music collection. To aid in such manipulation the digital audio management system 120 may provide an interface such as a web site or a mobile application (for example, a mobile phone application) with which the user can interact on utilizing the user's computing device 110. When the user utilizes such an interface the user may provide, or the digital audio management system may otherwise obtain, a clientID associated with the user. This clientID may be, for example, associated with a user's login credentials or identification.

Based on the clientID then, the digital audio management system 120 may obtain data on the user's digital music files from the data in the data store 122, for example using the core tables of data 124 or the user tables 126. Using this data a list of the user's digital music files may be presented to the user through the web site. This list may comprise, for example, the song names, artist names, album names, etc. of the digital music files stored in user's data store 112. Each item of the list may be associated with a digital music file in the user's data store 112, for example using a unique identifier.

More specifically, in one embodiment, each item of the presented list may be a link associated with a URL comprising a unique identifier associated with the digital music file on the user's data store 112. When an item is selected by a user using the interface, the link may be accessed. This link may be used to establish a relay between the digital audio management system 120 and the user's computer 110 such that the digital audio file on the user's data store 112 associated with the unique identifier may be played using the interface.

As can be seen then, using similar information digital music files associated with multiple users may be similarly identified. By identifying similar digital music files similarly, consistency can be achieved across the various users of the AG Entertainment system 190, enabling collaborative applications such as music recommendations, comparisons or sharing of information regarding digital music files.

For example, suppose one user has a digital music file labeled in one way and another user has the same digital music file labeled in a different way. If the two user's digital music files can be associated by assigning them the same identifiers this association may be taken advantage of, for example, to provide associated images, descriptions, videos, etc. to both users. Suppose for example that one user has a description or image (such as for example, liner notes or album artwork) associated with the digital music file that the other user does not have. By associating the digital audio files of the different users using the same identifiers, the descriptions, images, etc. belonging to one user may be distributed to the other user (or other users having the same digital audio file) through the AG Entertainment system 190.

Figure 2:
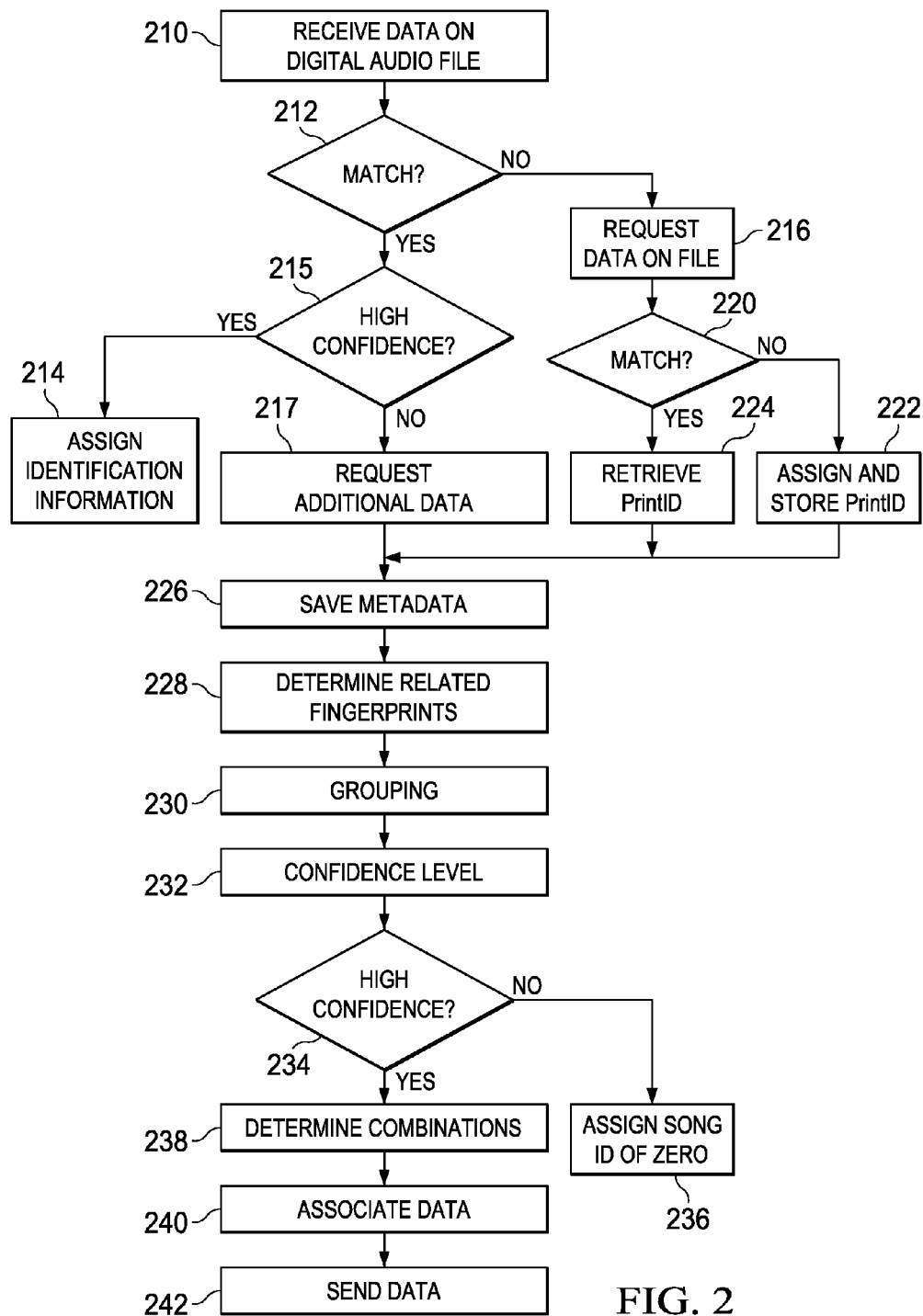
FIG. 2 depicts one embodiment of a method for identifying digital audio files.

A flow diagram for one embodiment of method for identifying a digital audio file is depicted in FIG. 2. Initially, a user may wish to manage a digital audio file (that may be referred to as the current digital audio file in the foregoing description of the embodiment of FIG. 2) on his data store 112 using the AG Entertainment system 120. This situation may occur, for example, when a user initially registers with the AG Entertainment system 120 and installs the client application 116 on his system 110, when the user adds another digital audio file 114 to his collection at a later point, when the user plays a particular digital audio file using client application 116, or for some other reason entirely.

At step 210 then, the client application 116 on the user's computing device 110 may send data on the digital audio file to the AG Entertainment application 190. In one embodiment, the client application 116 transmits a hash of the digital audio file (for example, an md5 hash or the like) to the AG Entertainment application 190 which provides this data to the song identification module 196. In certain embodiments this hash may be on the order of 100 bytes or so. It will noted that, as there may be multiple digital audio files 114 in a data store 122 associated with a user's computer certain techniques may be utilized to increase the efficiency of the communication of this data. For example, hashes for multiple digital audio files may be batched and sent in single or multiple transmissions.

At step 212 it can be checked if the digital audio file associated with the received hash has been identified before by comparing the received hash value with hash values for digital audio files which have previously been registered. In one embodiment, such previous identification may have occurred if another user has registered the exact same file using a client application 116. More specifically, the received hash may be compared to hashes stored in the data store 122 to determine if a match can be found. For example, the received hash may be compared to hashes stored in the hashtoprint table.

If the hash is matched it can be determined at step 215 if the confidence level for one or more identifiers associated with the hash is high enough. More specifically, in one embodiment, as discussed above the hash may be associated with a printID, where the printID may be associated with a songID and an albumID. The songID and the albumID may, in turn, be associated with a confidence level, as described with respect to the identifiedprints table discussed above.

It can be determined at step 215 if one or both of these confidence levels exceeds a threshold. Specifically, there may be one confidence level associated with the songID associated with the hash and another confidence level associated with the albumID associated with the hash. In one embodiment, the lower of the two confidence levels may be compared against a configurable threshold. Additionally, in one embodiment the songID associated with the hash may also be obtained. If the songID is not zero and the confidence level exceeds the threshold, the songID and albumID associated with the matching hash may be associated with digital audio file being identified at step 214.

If, however, the confidence level is below the threshold additional data associated with the digital audio file may be requested from the client application at step 217. Specifically, in this instance, as a fingerprint associated with the hash may have already been obtained, data (including metadata) associated with the digital audio file (for example, the file name, file size, play time in seconds, and any id3 tags) may be requested from the client application 116. This data, along with the previously received fingerprint and the printID associated with the previously received fingerprint will then be utilized as described beginning with step 226 below.

Returning to step 212, if the received hash is not matched, at step 216 data (including metadata) and a fingerprint associated with the digital audio file may be requested from the client application 116. The client application 116 responds with data (including metadata) associated with the digital audio file (for example, the file name, file size, play time in seconds, and any id3 tags) and an acoustic fingerprint (also referred to as a fingerprint or a print and which refers to an algorithmically determined integer created from at least a portion of a digital file, regardless of whether the digital file is an audio or other type of digital file) of the digital audio file. In one embodiment, a fingerprint comprises 892 integers, with each integer being 4 bytes in size. Fingerprints may be generated such that similar digital files will generate fingerprints that have small hamming distances, which is the number of bits that would need to be changed to convert one fingerprint into another. One embodiment of a fingerprinting algorithm that may be utilized is discussed in "Computer Vision for Music Identification" by Yan Ke et al published by the School of Computer Science at Carnegie Mellon, which is hereby fully incorporated by reference and that is documented on the website: http://www.yanke.org/research.htm. That particular paper describes a fingerprinting algorithm that uses 32 particular "filters" chosen from a much larger set to analyze audio for the purpose of matching audio samples after they have been played over a low-quality speaker and recorded using a low-quality microphone. The performance of the fingerprinting algorithm for grouping audio samples from the clients can be improved by using the techniques described in the paper to find the 32 filters that are best for identifying similar tracks after they have been encoded using different compression schemes (such as MP3 or AAC)

In certain embodiments, client application 116 may select a particular range of a digital audio file to generate the fingerprint. While a 12 second portion of the digital audio file may be utilized and may result in desired lookup or search properties, longer songs tend to have less unique content at the beginning of the track. To address this, the offset into a song from where the 12 second portion begins may be increased based on the length of the play time of the digital audio file. Very short songs may utilize a 12 second portion beginning with an offset of 0 seconds while the digital audio files with the longest play times may utilize a 12 second portion beginning with an offset of 5 minutes.

As play times may be utilized in certain embodiments, it also may be important that accurate play times for files be determined. Even for the same song play times can vary because different encoding software may add or remove silence at the beginning and end of the song. To overcome this, in one embodiment, the length of silent regions at the beginning and end of the digital audio file may be subtracted from the overall play time of track. Silent regions are determined by looking at the sum of the audio power (a sum of squares of pulse code modulation (PCM) samples) over small, shifted ranges. Once the sum exceeds an empirically determined threshold, the silent region is considered finished.

Returning to FIG. 2, once the metadata and the fingerprint corresponding to the digital audio file is received, it can be determined at step 220 if a match for the received fingerprint can be found. This matching may be performed by determining if an identical fingerprint associated with a substantially identical play time (as defined in the received metadata) can be located. As discussed above, the tables into which the fingerprint may be saved may be sharded by play time. Thus, to attempt to locate such a fingerprint the play time may be utilized to determine which table to search for the received fingerprint. Once this table is located a hash of the fingerprint may be calculated (for example, a hash comprising 4 byte integer or the like) to attempt to lookup one or more fingerprints in the table to compare to the received fingerprint. If any fingerprints are found based on the hash comparison, the received fingerprint may then be compared to the one or more fingerprints located through the hash comparison to see if the received fingerprint matches any of the one or more fingerprints located.

In one embodiment, for example, the fullprints table may be searched using a standard inverted index full text search, treating each unique integer (also called a key) in the fingerprint as a word. However, indexing all of the integers may be prohibitively expensive, so an optimization referred to as min-hashing may be applied in certain embodiments. Using min-hashing, a subset of the keys of each fingerprint in the table may be selected and indexed. To find fingerprints that are similar to the fingerprint from the client, a search is then run against the index after using the same min-hashing algorithm to identify which keys in the fingerprint from the client should be used to search the index.

If no match for the received fingerprint can be found, at step 222, the received fingerprint can be saved into data store 122 and assigned a unique identifier, known as a printID (for example, by using the auto-increment value assigned after creating a new row in the fullprints table). This assigned printID may also be associated with the originally received hash of the digital audio file at this point (for example, by creating a new row in the hashtoprint table). Such an identifier may, for example, be on the order of 8 bytes or so.

If, however, a match for the fingerprint is found, the printID of the found match is retrieved at step 224. In either case, the printID (assigned or retrieved) can be sent back to the client application 116 and stored on the data store 112 of that user's computer in association with the digital audio file from which the fingerprint was created such that generating the fingerprint (a relatively computationally expensive operation) for that digital audio file can be avoided in the future.

In any event, after a printID and the associated data (including metadata) have been obtained, at step 226 the metadata received from the client application 116 (for example, at step 216 or step 217) may be saved and associated with the printID or a clientID corresponding to the user or user's computer from which the metadata was received, such that the metadata associated with a printID can be easily accessed and the information that may be utilized by AG Entertainment system 190 increased. This saving may be done, for example, by adding a row to the metadata, identifiedprints, artist, song or album tables. In certain embodiments, only one copy of metadata per hash per user may be saved so that a single client does not add multiple copies of metadata to the database if they register several copies of the same digital audio file.

Next, at step 228, a set of related fingerprints (and printIDs and metadata associated with those printIDs) may be determined. Thus, a number of tables that are to be searched may be determined and similar to the search described above, an inverted index full text search with min-hashing may be used to locate a set of related fingerprints. This set of related fingerprints may be those fingerprints which were generated from digital audio files having a similar playing time (within some threshold time) to the digital audio file that is being identified. This set of related fingerprints may be further refined by determining which of this set of related fingerprints are within a certain "shifted hamming distance" of the fingerprint for the current digital audio file. Shifted hamming distances may be utilized instead of simple hamming distances, because many digital audio files have a slightly different start point. By checking for the shortest distance after shifting the fingerprints forward and back a number of bits (for example, by up to two hundred), better matches for similar digital audio files may be generated. It should be noted that simple or other types of hamming distances may also be utilized or the set of fingerprints may not be refined based on hamming distances.

At this point, a set of related fingerprints for digital audio files that are acoustically similar to the original digital audio file have been determined. This set of related fingerprints and printIDs may, however, not be associated with the same song name, artist name or album name as the digital audio file associated with the current fingerprint. At step 230, then, the song names, album names or artists associated with the set of related fingerprints may be grouped. More specifically, in one embodiment the metadata associated with each of the related fingerprints may be obtained. For example, the printID associated with each of the related fingerprints may be used to access the metadata tables and each row in the metadata tables that correspond to these printIDs may be accessed. For each printID then, there may be one or more associated song names, artist names and album names.

To group by song name then, the song name and artist name of the metadata may utilized to determine which combination of song name and artist name (e.g. "Rattled By the Rush" and "Pavement") should be grouped together. Similarly, it can be determined which combination of album name and artist name (e.g. "Wowee Zowee" and "Pavement") should be grouped together. When grouping these combinations, in one embodiment, loose matching rules may be utilized. Such algorithms for text matching may be known in the art and may be utilized to account for spelling mistakes, capitalization, the presence or lack thereof of articles, white space, etc. (for example, "The Clash" and "Clash" would be considered equivalent).

Accordingly, at the end of this step there exist a set of groups for combinations of song name and artist name. Each of these groups comprises all occurrences of a song name and artist name combination that occurs in the metadata associated with the related fingerprints that are to be considered equivalent. Similarly, there exist a set of groups for combinations of album name and artist name. Each of these groups comprises all occurrences of an album name and artist name combination that occurs in the metadata associated with the related fingerprints that are to be considered equivalent Thus, from the groupings of these combinations it can be determined which combination of song name and artist name occurs most frequently (e.g. the grouping of song name and artist name combinations with the highest number of entries) and which combination of album name and artist name occur most frequently in the metadata associated with the related fingerprints (e.g. the grouping of album name and artist name combinations with the highest number of entries). If two or more song name and artist name combinations or album name or artist name combinations are tied for the most popular it can be checked if any of them match an existing database of music (for example, the public Music Brainz database www-.musicbrainz.org) and if so, the matching combination may be considered as occurring the most often.

At step 232 then, one or more associated confidence levels may be generated. More specifically, a confidence level may be generated for a combination of song name and artist name by counting the number of occurrences of the combination of song name and artist name that occurs most often and the number of occurrences of the combination of song name and artist name that occurs next most often and subtracting the two. In other words, the grouping of song name and artist name combinations with the largest number of entries and the second largest number of entries may be subtracted from one another. For example, if the combination of "Some Girls are Bigger than Others" and "The Smiths" occurs most often and occurs 10 times and the combination of "Some Girls are Bigger than Other Girls" and "Smiths" occurs 2 times the confidence level for the combination of "Some Girls are Bigger than Others" and "The Smiths" may be 8.

Similarly, a confidence level may be generated for a combination of album name and artist name by counting the number of occurrences of the pair of album name and artist name that occur most often and the number of occurrences of the pair of album name and artist name that occurs next most often and subtracting the two. In other words, the grouping of album name and artist name combinations with the largest number of entries and the second largest number of entries may be subtracted from one another. For example, if the combination of "The Queen is Dead" and "The Smiths" occurs most often and occurs 7 times and the combination of "The Queen" and "Smiths" occurs 3 times the confidence level for the combination of "The Queen is Dead" and "The Smiths" may be 4.

As it may only be desired to add information to the database used by the AG Entertainment application 190 that is reliable it may be determined at step 234 if the confidence level generated for either or both of the combinations exceeds a threshold. It will be noted here that the thresholds to be applied to the confidence level for the combination of the song name and artist name may be different or the same as the threshold to be applied to the confidence level for the combination of the album name and artist name and that none, some or all of the data may be associated with a current fingerprint based on the outcome of this comparison. If both the confidence levels are below their respective thresholds, at step 236 the current fingerprint may be assigned a songID of zero and no further action may be taken. Alternatively, the printID associated with the received fingerprint and the digital audio file may be sent to the client application 116 where it is stored to allow the client to rapidly transmit information about the digital audio files 114 in the future as is discussed later.

If, however, one or both confidence levels exceeds its respective threshold (for example, a confidence level of 4) the most popular combination of song name and artist name and album name and artist name may be determined at step 238. In particular, each grouping of combination of song name and artist name may comprise occurrences of song name and artist name that may or may not be exactly the same (for example, the metadata associated with each of these related fingerprints may not be the same) but are considered equivalent. Thus, the combination of song name and artist name that occurs most frequently within the grouping of song names and artist names with the highest confidence or the highest number of entries may be determined. Similarly the combination of album name and artist name that occurs most frequently within the grouping of album names and artist names with the highest confidence or the highest number of entries may also be determined. It will be noted that during this determination, in one embodiment, a "corrections" database may also be utilized to check to see if any of the variations of song name, artist name, album name, etc. occurring within a grouping are known misspellings or otherwise common mistakes such that these mistakes can be corrected for purposes of this determination. Using these corrected strings, then, the most common song name and artist name or album name and artist name may be selected from the grouping.

Data may then be associated with the digital audio file at step 240. In particular, in one embodiment, once the most commonly occurring combination of song name and artist name within the grouping of combination of song names and artist names with the highest confidence or more occurrences has been determined it can be attempted to locate the artist name (e.g. in the artist table) and obtain the artistID associated with the artist name. If no such artist name exists, an artistID may be created and associated with artist name. Using this artistID it can then be checked if the combination of the artistID and the song name exists (e.g. in the songs table). If the combination does not exist, the combination may be stored (e.g. by creating an entry in the songs table with a new songID), otherwise the songID corresponding to the combination is obtained.

Similarly, once the most commonly occurring combination of album name and artist name within the grouping of combinations of album names and artist names with the highest confidence or more occurrences has been determined it can be attempted to locate the artist name (e.g. in the artist table) and obtain the artistID associated with the artist name. If no such artist name exists, an artistID may be created and associated with artist name. Using this artistID it can then be checked if the combination of the artistID and the album name exists (e.g. in the albums table). If the combination does not exist, the combination may be stored (e.g. by creating an entry in the albums table with a new albumID).

Associations may then be created for the identified current fingerprint associated with the digital audio file. More specifically, an entry in the identified prints table may be created using the printID assigned to the current fingerprint, the songID associated with the fingerprint, the confidence level generated for the song name, the albumID associated with the fingerprint and the confidence level generated for the album name.

Furthermore, the songID associated with the current fingerprint may be associated with all of the printIDs corresponding to the related set of fingerprints and metadata determined at step 228. For example, by altering entries for these related fingerprints in the identifiedprints table. If those fingerprints previously had a songID associated with them, their songID is changed and the previous songID is flagged for deletion if it has no other fingerprints associated with it. The songID or printID associated with the current fingerprint and the digital audio file is then sent to the client application 116 at step 242 where it may be stored to allow the client to rapidly transmit information about the digital audio files 114 in the future.

In one embodiment, a fingerprint may not have an associated songID if none of the refined set of metadata was of sufficiently high quality to identify the digital audio file when it was analyzed at step 232. In such instances, when more metadata is later received from another client application 116 for another fingerprint similar to the refined set of fingerprints, the original fingerprint may be assigned a songID based on an analysis of the newly received fingerprint (as discussed above). When the original client application 116 comes online later, it will send the printID for the unidentified original fingerprint to the AG Entertainment Application 190, which can then check if that printID has been assigned a song and send the associated songID back to the original client application 116.

Through this process, the information in the data store corresponding to digital audio files 114 at user's computing systems 110 can be continually improved. A client may come online with incorrect metadata for a digital audio file, but once other clients come online with the correct, or more correct metadata, the original song identification will be deleted and the original fingerprint will be associated with the new song. Thus, embodiments of this invention eliminate the need for a master set of "known" fingerprints or an existing database of song and artist names. As clients send in more metadata and fingerprints prints, the database at AG Entertainment system 120 both grows and corrects the associated song and artist names.

It may be helpful to an understanding of embodiments of the present invention to give a simple example with respect to the determination of a song name. Assume, as a starting point that the AG Entertainment system 190 has previously received two fingerprints that have been previously assigned printIDs 1 and 2 respectively. Additionally, Print 1 has the following metadata (e.g. in a metadata table) associated with 3 different users (e.g. clientIDs):
"I am the walrus" by "The Beatles"
"Track 06" by "Unknown Artist"
"I am the walrus" by "The Beatles!"
And Print 2 has the following metadata, from 1 user:
"I am the walrus" by "The Beatles"

Assume now, that AG Entertainment system 190 while attempting to identify a digital audio file on a new user's computer receives a hash and a fingerprint, where the fingerprint is identified as matching Print 2. When trying to identify this digital audio file the metadata associated with Print 2 may be grouped into the following two groups (with the application of one or more linguistic matching algorithms):
Group A:
"I am the walrus" by "The Beatles"
"I am the walrus" by "The Beatles!"
"I am the walrus" by "The Beatles"
Group B:
"Track 06" by "Unknown Artist"

Here, Group A may be selected as the grouping with the most occurrences of the song name and artist name (3 occurrences versus 1 occurrence with respect to group B). The confidence level can then be calculated for Group A as 2, (the 1 occurrence of Group B subtracted from the 3 occurrences of Group A). Next, the most commonly occurring song name and artist name combination may be selected from within Group A. Here, "I am the walrus" by "The Beatles" may be selected since it occurs the most often (2 times). Thus, the song name and album name "I am the walrus" with confidence level 2 may be associated with the PrintID 2 (for example, in the identifiedprints table).

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:
1. A system for managing digital files, comprising:
a plurality of user computers, each user computer comprising:
    a data store having one or more digital audio files, and
    a non-transitory computer readable medium comprising
        a client application configured to send a fingerprint of a digital audio file to a digital audio management system; and
a digital audio management system coupled to the plurality of user computers, the digital audio management system comprising:
    a processor,
    a data store comprising metadata on a plurality of digital audio files stored on the data store of the plurality of user computers, and
    a non-transitory computer readable medium comprising compute instructions for:
        associating the digital audio file with a song name, wherein associating the digital file with the song name comprises,
        receiving the fingerprint associated with the digital audio file from the client application on a user computer;
        obtaining metadata associated with one or more digital audio files based on the fingerprint, wherein the metadata comprises one or more song names associated with the plurality of digital audio files stored on the plurality of user computers,
        processing the one or more song names to determine a song name of the one or more song names to associate with the digital audio file, wherein processing the one or more song names includes grouping the one or more song names associated with the plurality of digital audio files stored on the plurality of user computers into one or more groups and determining the song name based on a confidence level determined based on the one or more groups, and associating the digital audio file and the plurality of digital audio files stored on the plurality of user computers with the song name.

2. The system of claim 1, wherein the one or more digital audio files are acoustically similar to the digital audio file.

3. The system of claim 2, wherein obtaining the metadata comprises determining a set of related fingerprints based on the received fingerprint, wherein the set of related fingerprints are associated with the one or more digital audio files.

4. The system of claim 1, wherein each group comprises song names that are considered equivalent.

5. The system of claim 4, wherein processing the one or more song names comprises determining a most common song name within a group with the highest number of entries.

6. The system of claim 5, wherein associating the song name with the digital audio file comprises determining the confidence level associated with the group with the highest number of entries, wherein the confidence level exceeds a threshold.

7. The system of claim 1, wherein the song name and the one or more song names comprise a song title, an artist name, an album name or any combination of song title, artist name or album name.

8. A method for identifying digital files, comprising:
at a digital audio management system coupled to a plurality of user computers, each user computer including a data store having one or more digital audio files and a client application configured to send a fingerprint of a digital audio file to the digital audio management system:
accessing a data store comprising metadata on a plurality of digital audio files stored in the data stores of the plurality of user computers; and
associating the digital audio file with a song name, wherein associating the digital file with the song name comprises,
receiving a fingerprint associated with the digital audio file from the client application on a user computer of the plurality of user computers,
obtaining metadata associated with one or more digital audio files based on the fingerprint, wherein the metadata comprises one or more song names associated with the plurality of digital audio files stored on the plurality of user computers,
processing the one or more song names to determine a song name of the one or more song names to associate with the digital audio file, wherein processing the one or more song names includes grouping the one or more song names associated with the plurality of digital audio files stored on the plurality of user computers into one or more groups and determining the song name based on a confidence level determined based on the one or more groups, and
associating the digital audio file and the plurality of digital audio files stored on the plurality of user computers with the song name.

9. The method of claim 8, wherein the one or more digital audio files are acoustically similar to the digital audio file.

10. The method of claim 9, wherein obtaining the metadata comprises determining a set of related fingerprints based on the received fingerprint, wherein the set of related fingerprints are associated with the one or more digital audio files.

11. The method of claim 8, wherein each group comprises song names that are considered equivalent.

12. The method of claim 11, wherein processing the one or more song names comprises determining a most common song name within a group with the highest number of entries.

13. The method of claim 12, wherein associating the song name with the digital audio file comprises determining the confidence level associated with the group with the highest number of entries, wherein the confidence level exceeds a threshold.

14. The method of claim 8, wherein the song name and the one or more song names comprise a song title, an artist name, an album name or any combination of song title, artist name or album name.

15. A non-transitory computer readable medium, comprising instruction for:
at a digital audio management system coupled to a plurality of user computers, each user computer including a data store having one or more digital audio files and a client application configured to send a fingerprint of a digital audio file to the digital audio management system:
accessing a data store comprising metadata on a plurality of digital audio files stored in the data stores of the plurality of user computers; and
associating a digital audio file with a song name, wherein associating the digital file with a song name comprises,
receiving a fingerprint associated with the digital audio file from the client application on a user computer of the plurality of user computers,
obtaining metadata associated with one or more digital audio files based on the fingerprint, wherein the metadata comprises one or more song names associated with the plurality of digital audio files stored on the plurality of user computers,
processing the one or more song names to determine a song name of the one or more song names to associate with digital audio file, wherein processing the one or more song names includes grouping the one or more song names associated with the plurality of digital audio files stored on the plurality of user computers into one or more groups and determining the song name based on a confidence level determined based on the one or more groups, and
associating the digital audio file and the plurality of digital audio files stored on the plurality of user computers with the song name.

16. The computer readable medium of claim 15, wherein the one or more digital audio files are acoustically similar to the digital audio file.

17. The computer readable medium of claim 16, wherein obtaining the metadata comprises determining a set of related fingerprints based on the received fingerprint, wherein the set of related fingerprints are associated with the one or more digital audio files.

18. The computer readable medium of claim 15, wherein each group comprises song names that are considered equivalent.

19. The computer readable medium of claim 18, wherein processing the one or more song names comprises determining a most common song name within a group with the highest number of entries.

20. The computer readable medium of claim 19, wherein associating the song name with the digital audio file comprises determining the confidence level associated with the group with the highest number of entries, wherein the confidence level exceeds a threshold.

21. The computer readable medium of claim 15, wherein the song name and the one or more song names comprise a song title, an artist name, an album name or any combination of song title, artist name or album name.

* * * * *